Sept. 19, 1939.　　　　　F. GRAF　　　　　2,173,553
CAMERA AND FOCUSING MEANS THEREFOR
Filed Nov. 17, 1937
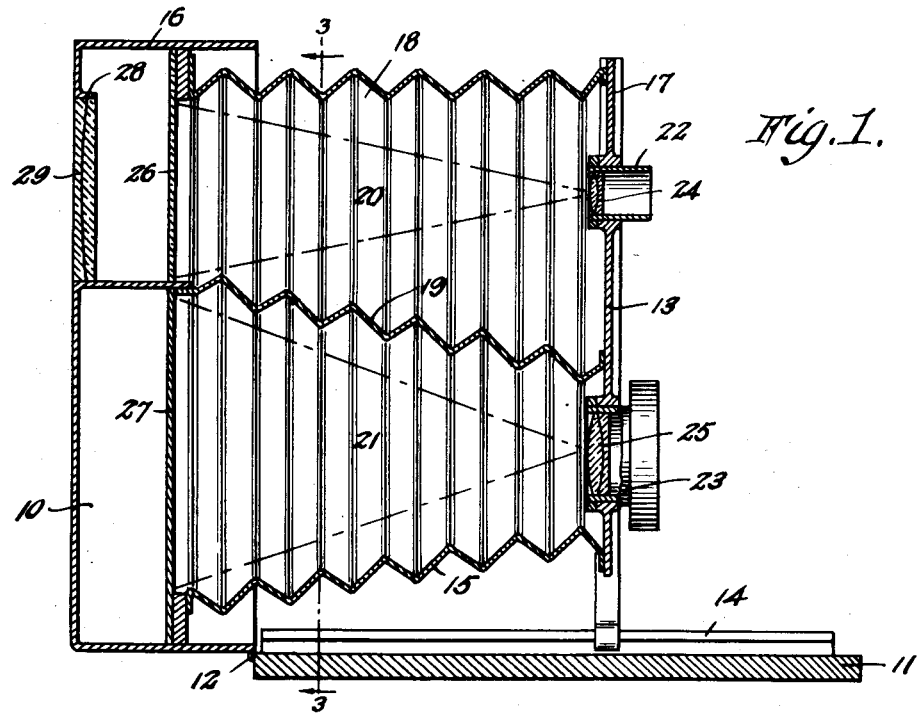
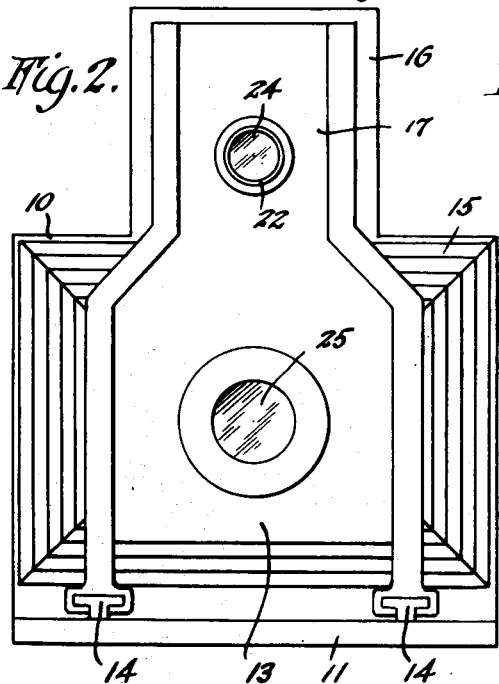
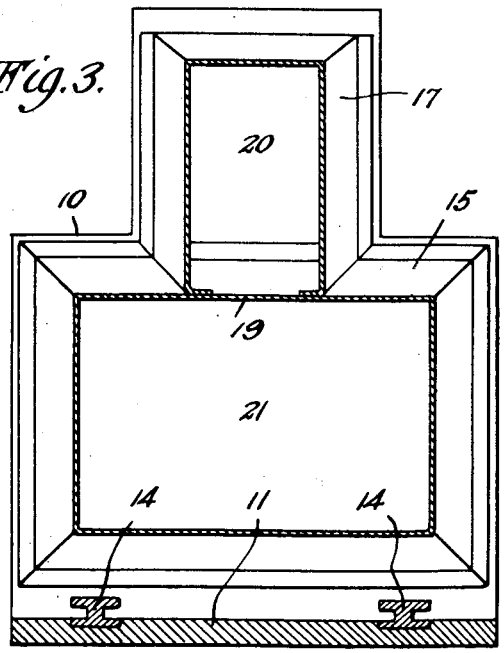
INVENTOR.
Frederick Graf
BY
Clark + Ott
ATTORNEYS Patented Sept. 19, 1939

2,173,553

UNITED STATES PATENT OFFICE 2,173,553

CAMERA AND FOCUSING MEANS THEREFOR

Frederick Graf, Flushing, N. Y.

Application November 17, 1937, Serial No. 174,951

1 Claim. (Cl. 95—44)

This invention relates to cameras and comprehends a camera provided with improved means for visually focusing the image coincident with the focusing of the same with reference to a light sensitive film in the camera, the invention being applicable to folding or box cameras in which either film plates, film packs or roll films are used.

The invention eliminates the necessity of providing a camera with the usual finder or distance indicator and the difficulties incident thereto, while the visual focusing means also aids the photographer in the selection of the proper light stop opening required for obtaining the best results.

More particularly the invention resides in the provision of a camera including a hollow box-like body with means subdividing said body into superimposed auxiliary and main compartments having at the front thereof matched auxiliary and main lenses together with means adjacent the rear of the auxiliary compartment for finding and visually focusing the image to be photographed and with means adjacent the rear of the main compartment for supporting a light sensitive film whether the same be in the form of a film plate, film pack or roll film.

As a further feature the invention provides means for simultaneously adjusting the matched auxiliary and main lenses so that the image will be properly focused in unison on the visual focusing means and with reference to the light sensitive film.

The invention also embodies in a camera of the character set forth means cooperating with the finding and visual focusing arrangement which functions to right and magnify the image so that the photographer may obtain a more accurate location and focusing of the image and gaging of the proper light stop opening to be employed.

Other advantages of the invention reside in the provision of a visual focusing means for cameras which neither appreciably increases the weight or overall size of the camera, nor materially adds to the cost of production of the same.

With the above enumerated and other objects in view reference is now made to the following specification and the accompanying drawing in which there is disclosed, by way of example, a preferred embodiment of the invention, while the appended claim covers variations and modifications thereof falling within the scope of the invention.

In the drawing:

Fig. 1 is a vertical longitudinal sectional view through a camera constructed in accordance with the invention.

Fig. 2 is a front view thereof.

Fig. 3 is a cross sectional view therethrough taken approximately on the line 3—3 of Fig. 1.

Referring to the drawing by characters of reference and more particularly to the form of the invention illustrated in Figs. 1 to 3 of the drawing, 10 designates the body or casing of a folding type camera having a cover 11 hinged thereto as at 12 to swing downwardly at right angles to the body when the same is disposed in an upright position.

The camera is further provided with a front board 13 which is adapted to slide forwardly on the guides 14 provided on the inner surface of the cover 11 and to be adjusted towards and away from the body 10 in any suitable manner. As is customary in this type of camera, a hollow bellows structure 15 is connected at its forward end to the front board and at its rear end to the body 10 so as to provide together with the body and front board a hollow box-like structure.

In the present instance the upper portion 16 of the body 10, the upper portion 17 of the front board and the upper portion 18 of the bellows are of relatively reduced width with reference to the lower main portion of said parts and preferably centrally located transversely thereof, and said upper and lower portions are divided or separated by a partition 19 to define by said portions superimposed auxiliary and main compartments 20 and 21. The front board has mounted in openings communicating with said auxiliary and main compartments lens barrels 22 and 23 which have arranged therein matched auxiliary and main lenses 24 and 25.

Adjacent the rear of the auxiliary compartment 20 in axial alignment with the auxiliary lens 24 is a ground glass or equivalent translucent focusing plate 26, while below and in the main compartment 21 is a suitable means for supporting in the same plane therewith a sensitized film 27, it being understood that the focusing plate is of a smaller area than the sensitized film but of the same shape and relatively proportionate with reference thereto and with reference to the matched auxiliary and main lenses whereby the image of the object appearing on the focusing plate will be identical with, but of a smaller size than the image of the object to be exposed to the sensitized film.

It thus follows that the photographer observing the focusing plate through a rear opening 28 in the reduced portion 16 of the body 10 will see the same object which will be presented to the sensitized film 27 and may, therefore, obtain the proper focus by adjusting the front board 13 towards or away from the body 10. The photographer may also gage the proper light stop opening to be employed in accordance with the appearance of the image on the focusing plate.

If desired, a suitable lens combination diagrammatically shown as at 29 may be arranged in the rear opening 28 for righting the image and magnifying the same so as to further assist the photographer in properly locating the image on the focusing plate and determining the proper focus. Obviously the entrance of light to the main compartment 21 will be controlled by any of the usual forms of shutters and stop plates which have been omitted in the present disclosure.

What is claimed is:

In a folding camera, a body having rigidly fixed superimposed main and auxiliary compartments, the latter being of relatively lesser width and height than the former, a front board adjustable towards and away from said body having an upper portion of relatively lesser width and height than the lower portion thereof, a bellows structure connected at its rear end to said body and at its forward end to said front board, the upper portion of said bellows structure being of relatively lesser width than the lower portion thereof and coextensive in length therewith, a plaited partition foldable with the bellows structure and sub-dividing the same into upper and lower compartments along the juncture of the upper and lower portions thereof, matched auxiliary and main lenses rigidly carried by the front board, a screen adjacent the rear of the upper bellows compartment for finding, displaying and focusing the image to be photographed and means adjacent the rear of the lower bellows compartment for supporting a light sensitive film in the same plane with the screen.

FREDERICK GRAF.